(12) United States Patent
McDonald et al.

(10) Patent No.: US 11,906,137 B1
(45) Date of Patent: Feb. 20, 2024

(54) MECHANICAL COLOR CHANGING SECURITY LIGHT

(71) Applicant: HeathCo LLC, Bowling Green, KY (US)

(72) Inventors: Miles William McDonald, Bowling Green, KY (US); Lionel V. Luu, Bowling Green, KY (US); Kushagra Dixit, Bowling Green, KY (US); Scott Blaise Tylicki, Bowling Green, KY (US)

(73) Assignee: HEATHCO LLC, Bowling Green, KY (US)

( * ) Notice: Subject to any disclaimer, the term of this patent is extended or adjusted under 35 U.S.C. 154(b) by 0 days.

(21) Appl. No.: 18/052,044

(22) Filed: Nov. 2, 2022

Related U.S. Application Data

(60) Provisional application No. 63/277,262, filed on Nov. 9, 2021.

(51) Int. Cl.
| | |
|---|---|
| *F21V 17/00* | (2006.01) |
| *F21K 9/237* | (2016.01) |
| *F21V 5/04* | (2006.01) |
| *G02B 5/22* | (2006.01) |
| *F21V 23/04* | (2006.01) |
| *F21V 5/00* | (2018.01) |
| *F21V 9/08* | (2018.01) |

(Continued)

(52) U.S. Cl.
CPC ............ *F21V 17/002* (2013.01); *F21K 9/237* (2016.08); *F21V 5/008* (2013.01); *F21V 5/048* (2013.01); *F21V 9/08* (2013.01); *F21V 17/06* (2013.01); *F21V 23/0471* (2013.01); *F21V 31/005* (2013.01); *G02B 5/226* (2013.01)

(58) Field of Classification Search
CPC .......... F21K 9/237; F21V 5/008; F21V 5/048; F21V 9/08; F21V 17/002; F21V 17/10; F21V 17/104; F21V 17/16; F21V 31/00; F21V 31/005; F21V 23/0471; G02B 5/226
See application file for complete search history.

(56) References Cited

U.S. PATENT DOCUMENTS

| | | |
|---|---|---|
| 5,915,828 A | 6/1999 | Buckley |
| 6,203,173 B1 * | 3/2001 | Duff ...................... F21V 17/20 362/267 |
| 6,252,638 B1 | 6/2001 | Johnson et al. |

(Continued)

FOREIGN PATENT DOCUMENTS

KR     20080004841 U     10/2008

OTHER PUBLICATIONS

Djworld, Djworld Hot Selling LED Spot Moving Head Light Accessories 90W 6 Prisms 60W 30W Color & Wheel Good for DMX 512 Stage Light, CICIG, Retrieved from: https://www.cicig.co/product/yiyzuuu0h; Retrieved on Apr. 29, 2021.

*Primary Examiner* — Alan B Cariaso
(74) *Attorney, Agent, or Firm* — Gray Ice Higdon

(57) ABSTRACT

The present disclosure sets forth a security light with the flexibility of modifying the color output of the light source by using simple mechanical color filters mounted over the light source. The security light may comprise at least one lamp head with a light source, an inner lens, a filter frame element, an outer lens, an exchangeable mechanical color filter, a locking mechanism, and a sealing mechanism.

20 Claims, 7 Drawing Sheets

(51) Int. Cl.
 *F21V 31/00* (2006.01)
 *F21V 17/06* (2006.01)

(56) References Cited

U.S. PATENT DOCUMENTS

| | | |
|---|---|---|
| 6,814,459 B2 | 11/2004 | Pederson |
| 7,331,692 B2 | 2/2008 | Baiardi et al. |
| 8,506,114 B2 | 8/2013 | Van De Ven |
| 9,964,286 B1 | 5/2018 | Sooferian |
| 10,400,966 B2 | 9/2019 | Chang et al. |
| 10,667,467 B2 | 6/2020 | Kwok et al. |
| 10,941,924 B2 | 3/2021 | Yu et al. |
| 2015/0362155 A1* | 12/2015 | Thomsen ............... F21V 5/008 362/268 |
| 2016/0334079 A1* | 11/2016 | Donnini ............... F21V 17/102 |
| 2017/0082254 A1* | 3/2017 | Zhang ................... F21V 29/73 |
| 2018/0266659 A1* | 9/2018 | Ho ........................ G03B 17/565 |
| 2020/0011491 A1* | 1/2020 | Cao ........................ F21V 5/045 |

\* cited by examiner

MECHANICAL COLOR CHANGING SECURITY LIGHT

BACKGROUND

Security lights typically are designed to produce only a single color of light. However, different colors of light may be desired. For example, color changing security lights may be desired by users for decoration purposes. This disclosure generally relates to a color changing security light with exchangeable mechanical color filters. More particularly, the disclosure provides for a security light wherein the light is able to transmit through interchangeable mechanical color filters so that the color of the light emanating from the security light can be selectively varied according to preferences and situations.

SUMMARY

The present disclosure sets forth an outdoor security light with the flexibility of modifying the color output of the light source by using simple mechanical color filters mounted over the light source. The light fixture may be provided with a number of different color filters that can be slid into a filter frame coved by a lens cover with an adjacent sealing mechanism, the interchangeable color filter(s) may be replaced depending on the desired color output. The sealing mechanism provided at the sliding entry port of the filter frame may prevent water, rain, wind, dusts, bugs, and the like foreign matters from intruding into the interior filter and lighting compartment.

Consistent with various aspects of the present disclosure, a security light with color changing capability is provided. In some embodiments, the security light may include at least one lamp head having a peripheral edge, an inner lens mountable over and retained on the peripheral edge of the at least one lamp head, a filter frame element positioned between the inner lens and an outer lens and with a filter frame element opening along one side, a mechanical color filter slidable through the filter frame element opening and surrounded by the filter frame element, a locking mechanism between the outer lens and the at least one lamp head for structurally retaining the outer lens, the filter frame element, and the inner lens on the at least one lamp head, and a sealing mechanism at the filter frame element opening. In such embodiments, the peripheral edge of the at least one lamp head may surround a light source, and the outer lens may retain the filter frame element in position against the inner lens and may mount to the at least one lamp head positioning the filter frame element between the outer lens and the inner lens. The outer lens may also have an outer lens opening in substantial alignment with the filter frame element opening.

In some embodiments, the inner lens may have an inner lens projection, and the peripheral edge of the at least one lamp head may include a first channel formed by a first lip element and a second vertical lip element for receiving the inner lens projection. In such embodiments, a height of the first vertical lip element may be larger than that of the second vertical lip element. In some embodiments, a thickness of the mechanical color filter may be larger than that of the filter frame element opening along the one side of the filter frame element, and the sealing mechanism may include one or more pliable gasket elements at the filter frame element opening along the one side of the filter frame element. In some embodiments, the locking mechanism may include a slot and a protrusion. The slot may be formed on one of the peripheral edge of the at least one lamp head and a periphery of the outer lens, and the protrusion may be formed on the other one of the peripheral edge of the at least one lamp head and the periphery of the outer lens. In such embodiments, the slot and the protrusion may include a plurality of slots and a plurality of protrusions. The plurality of protrusions may include a plurality of elastic body locks, and the plurality of slots may include a plurality of lock receiving openings. In some other embodiments, the outer lens may further include a continuous circumferential flange and/or internal channel substantially surrounding the filter frame element to retain the filter frame element within the outer lens, and the continuous circumferential flange of the outer lens and a first vertical lip element of the peripheral edge of the at least one lamp head may form a second channel for receiving a filter frame projection. In such embodiments, the continuous circumferential flange may further include a second opening in alignment with a location of the filter frame element opening along the one side of the filter frame element, and the mechanical color filter may further include an extension portion that extends a distance from the second opening on the continuous circumferential flange of the outer lens. In some embodiments, the light source may be a plurality of LEDs, and the mechanical color filter may serve as a light diffuser.

In some embodiments, the security light may include at least one lamp head having a peripheral edge surrounding a light source, an inner lens mountable over and retained on the peripheral edge of the at least one lamp head, an outer lens having an opening along one side, a mechanical color filter slidable through the opening along the one side of the outer lens and positioned between the inner lens and the outer lens and surrounded by a gasket ring, and a locking mechanism between the outer lens and the at least one lamp head to structurally retain the outer lens, the mechanical color filter, and the inner lens on the at least one lamp head. The outer lens may retain the gasket ring in position against the inner lens and may mount to the at least one lamp head positioning the gasket ring between the outer lens and the inner lens. In such embodiments, the security light may further include an opening filling gasket coupled with the opening along the one side of the outer lens, and the mechanical color filter may further include a gasket strip at a side approximate the opening along the one side of the outer lens.

In some further embodiments, the security light may include at least one lamp head having a peripheral edge surrounding a light source, an inner lens mountable over and retained on the peripheral edge of the at least one lamp head, a pliable filter frame element positioned between the inner lens and an outer lens and with a filter frame element opening along one side, a mechanical color filter, and a locking mechanism between the outer lens and the at least one lamp head to structurally retain the outer lens, the pliable filter frame element, and the inner lens on the at least one lamp head. In such embodiments, the outer lens may retain the pliable filter frame element in position against the inner lens and may mount to the at least one lamp head positioning the pliable filter frame element between the outer lens and the inner lens. The outer lens may also have a continuous circumferential flange substantially surrounding the pliable filter frame element to retain the pliable filter frame element within the outer lens and a second opening in alignment with a location of the filter frame element opening along the one side of the pliable filter frame element. The mechanical color filter may be slidable through the filter frame element opening along the one side of the pliable filter frame element and the aligned second opening on the continuous circumferential flange of the outer lens, and may be positioned between the inner lens and the outer lens and surrounded by the pliable filter frame element. The mechanical color filter may also have an extension portion that extends a distance from the second opening on the continuous circumferential flange of the outer lens.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above-outlined features are to be understood as exemplary only, and many more features and objectives of the various embodiments may be gleaned from the disclosure herein. Therefore, no limiting interpretation of this summary is to be understood without further review of the entire specification, claims, and drawings included herewith. A more extensive presentation of features, details, utilities, and advantages of the present disclosure is provided in the following written description of various embodiments of the disclosure, illustrated in the accompanying drawings, and defined in the appended claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure

DETAILED DESCRIPTION

Figure 1:
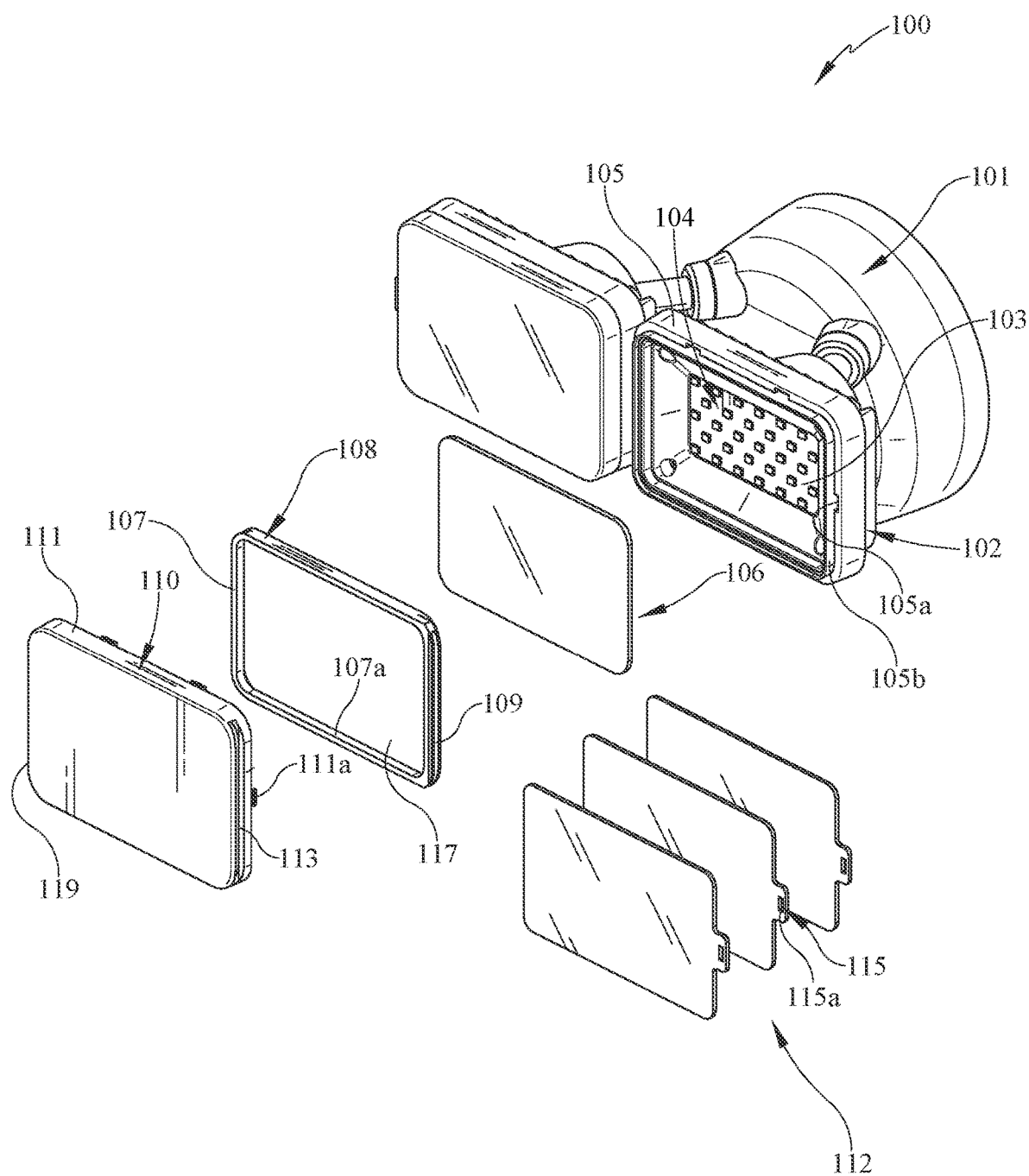
FIG. 1 is a perspective disassembled view of a color changing security light, according to an embodiment of the present disclosure.
Figure 2:
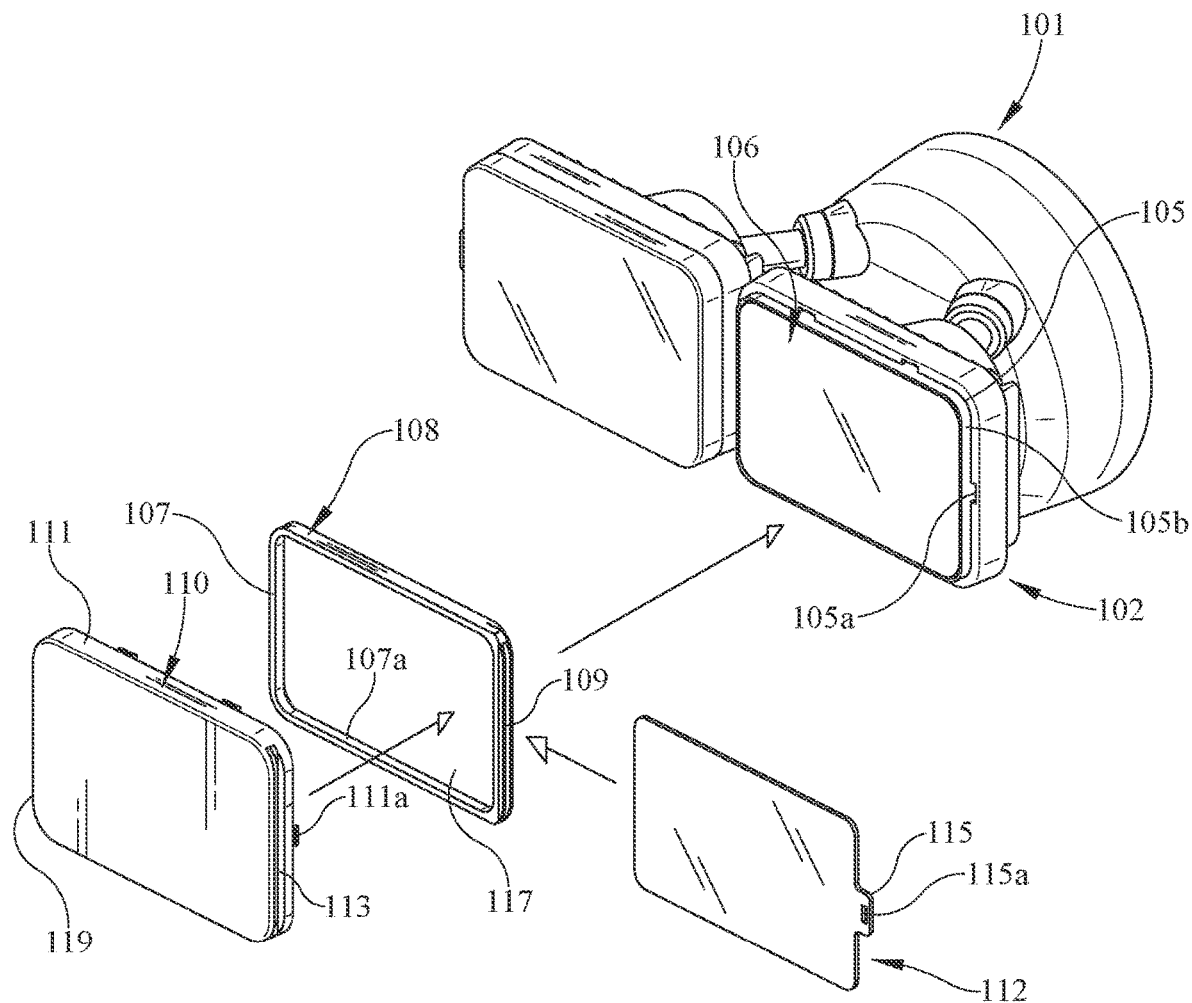
FIG. 2 is a perspective partially disassembled view of the color changing security light of FIG. 1, according to an embodiment of the present disclosure.

As depicted in the drawings, wherein like numbers denote like parts throughout the several views, a color changing security light 100 in accordance with various embodiments will be described with reference to the accompanying drawings. As shown in FIGS. 1 and 2, the security light 100 may include at least one lamp head 102 with a light source 104, an inner lens 106, a frame element 108, an outer lens 110, and an exchangeable mechanical color filter 112. In some embodiments, the lamp head 102 may be attached to a light mount 101 via one or more adjustable arms to allow the security light 100 to be mounted in multiple configurations. For example, FIGS. 1 and 2 illustrate a typical installation and orientation of the security light 100 with the light mount 101 mounting against a side wall surface, and the orientation of the lamp head 102 may be adjusted axially. The security light 100 may be mounted against the outer surface of a residence or business and be connected to an electrical supply to power the security light and the light emitters. Various electronics may be positioned internal to the security light and/or with the lamp heads. Motion detection functionality may be provided with appropriate sensors mounted to the lamp head or to other components of the housing.

In some embodiments, the lamp head 102 may include an interior volume 103 with a peripheral edge 105 for accommodating the one or more light sources 104, and the inner lens 106 may be mountable over and removably retained on the peripheral edge 105 of the lamp head 102. In some embodiments, the light source 104 within the lamp head 102 may include a plurality of LEDs. In some embodiments, the security light 100 may be an outdoor security light including a motion sensor (not shown) with one or more of the lamp head(s) 102 utilizing an interchangeable mechanical color filter 112 to modify the light output characteristics of the security light system.

In some implementations, the lamp head 102 may be made of a heat conducting material which allows the dissipation of heat from the light emitting devices, such as LEDs, while the inner and outer lens 106 and 110 may be made of standard lens material such as polycarbonate or glass. The filter frame element 108 may be made of a pliable material such as silicon to act as a gasket in order to prevent intrusion of water, dust, and other foreign material from the side opening and between the inner and outer lens.

As shown in FIGS. 1 and 2, the filter frame element 108 which positionally retains the interchangeable filter elements 112 is inserted between the inner lens 106 and the outer lens 110. In some embodiments, the filter frame element 108 may include a continuous circumferential side 107 extending circumferentially around the peripheral edge 105 of the lamp head 102 and an open window or hollow portion 117 in the center. The continuous circumferential side 107 may be configured to firmly hold the color filter 112, and the open window or hollow portion 117 may be configured to allow the light emitted by the light source 104 and modified by the color filter 112 to pass through.

In still further embodiments, the filter frame element 108 may have an inner guiding channel which receives the interchangeable color filter 112 and positionally retains the color filter 112 in the filter frame element 108. For example, as shown in FIGS. 1 and 2, the inner surface of the continuous circumferential side 107 may include a channel 107a formed to receive the color filter 112 as it is slid into position through a filter frame element opening 109. The channel 107a may be formed on the inner facing side of the filter frame element 108 along three adjoining sides which captures and firmly positions the filter 112 in a pre-defined orientation and distance from the outer lens 110 and the inner lens 106. In other embodiments, the channel may be a depression that receives the color filter or can simply be an increased pliable area to properly seal not only around the color filter 112 but also at the side entry opening. In still further embodiments, the inner surface of the continuous circumferential side 107 need not include a channel or color filter receiving area and simply is pliable enough to properly and adequately seal against the surfaces of the color filter 112.

In some embodiments, the frame element 108 may have the opening 109 along the one side 107 configured for the slidably insertion of the color filter 112. In some embodiments, the opening 109 may also include a sealing mechanism to prevent foreign matters from intruding into the interior of the filter frame 108. It should be understood that the opening 109 may be omitted in some embodiments, and the filter 112 may be clipped within the filter frame 108 by extending and surrounding the filter frame 108 around the filter 112 in such embodiments. In some embodiments, the color filter 112 may be an exchangeable and constructed of a colorized or non-colorized (e.g. transparent) filter and constructed of adequately light permeable material such as glass or other polycarbonate. The replaceable color filter 112 may be presented in different colors and configured to modify the light output in variously desirable forms. For example, in some embodiments, the color filter 112 may be made from high light transmissive material and include certain additives to absorb and filter different wavelengths of light to create light color effects. For example, specific wavelengths of light can be filtered out of the emissions if desired.

Figure 3:
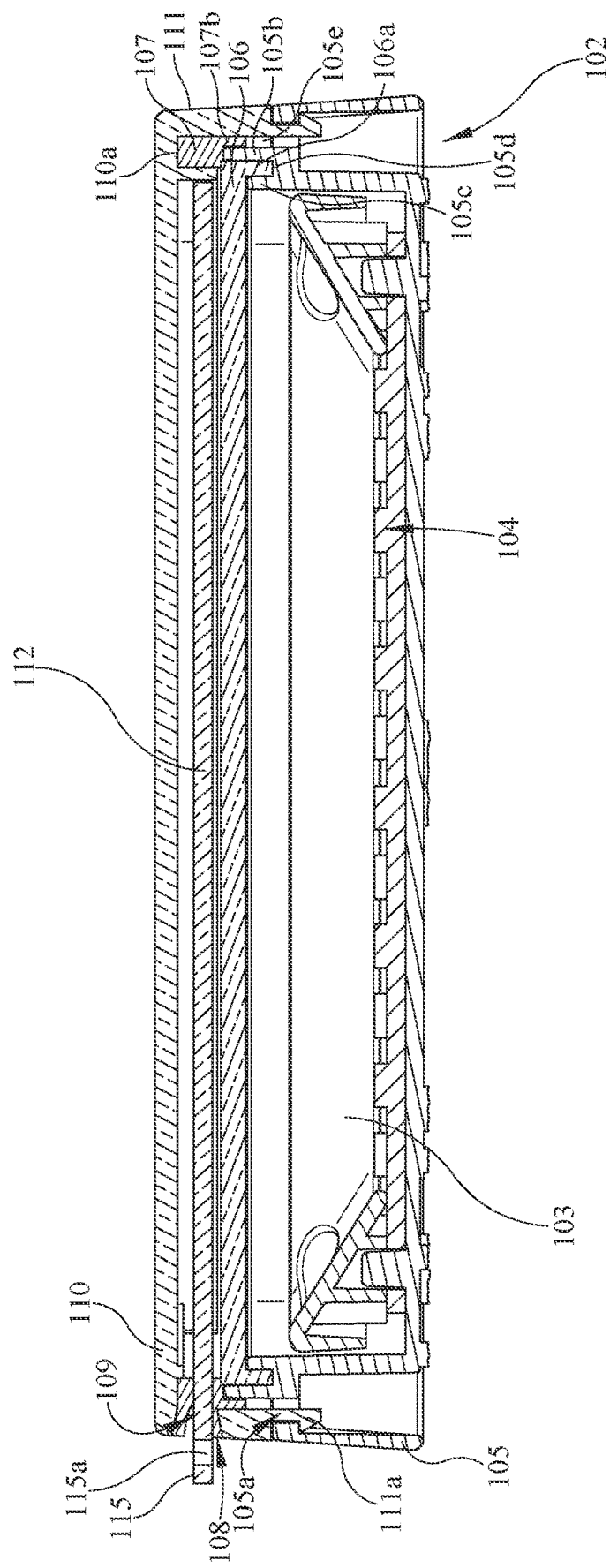
FIG. 3 is a cross-sectional view of a lamp head of the color changing security light of FIG. 1, according to an embodiment of the present disclosure.

In some embodiments, the outer lens 110 may be removably mountable over the frame element 108, the inner lens 106, and the peripheral edge 105 of the lamp head 102. In various implementations, the outer lens 110 may have an internal circumscribing channel or recess 110a as shown in FIG. 3, which receives the filter frame element 108 to securely position the filter frame element 108 in a position to expose the side openings of both the outer lens 110 and the filter frame element 108. The filter frame element 108 may further be either removably positioned in the recess or may be formed and retained permanently in the recess and conjoined with the outer lens 110.

The inner lens 106 and the outer lens 110 may be included for providing and/or enhancing light output, reducing lumen losses, protecting any or all components of the lamp head 102 (e.g., the light source 104). As shown here, the lens 106 and 110 may substantially cover the lamp head 102 and may be substantially translucent, transparent, and/or diffusing. In some embodiments, the lens 106 and 110 may be substantially planar as shown, although it should be understood that lens 106 and 110 may be any of a variety of shapes including, but not limited to, curved, prismatic, rounded, spherical, having a depth extending inwardly or outwardly, and/or any other shapes. In some embodiments, the lens 106 and 110 may be flexible plastic lens formed from a thin flexible sheet of plastic material or from tempered glass materials. In some embodiments, the color filter 112 may serve as a light diffuser instead of using the outer lens 110 as the light diffuser. In such embodiments, the outer lens 110 may be a clear regular cover lens.

In some embodiments, the security light 100 may further include a locking mechanism between the outer lens 110 and the lamp head 102 to maintain an engagement between the outer lens 110 and the lamp head 102. For example, the locking mechanism may compress the filter frame element 108 between the outer lens 110 and the inner lens 106 while maintaining a seal therebetween. The inner lens 106 may be sealed as well between itself and the peripheral edge 105 of the lamp head 102 by a separate seal or by an integrated seal within the lamp head 102. However, the locking mechanism may be utilized to maintain the structural integrity of the lens system (the combined outer and inner lens 106 and 110), color filter 112, and lamp head 102. For example, the locking mechanism may be provided to permanently seal the outer lens 110 and filter frame element 108 to the lamp head 102 so that it cannot be removed in order to maintain the integrity of the components, including the LEDs. In still further examples, the locking system may allow the lens system to be disassembled.

Figure 3A:
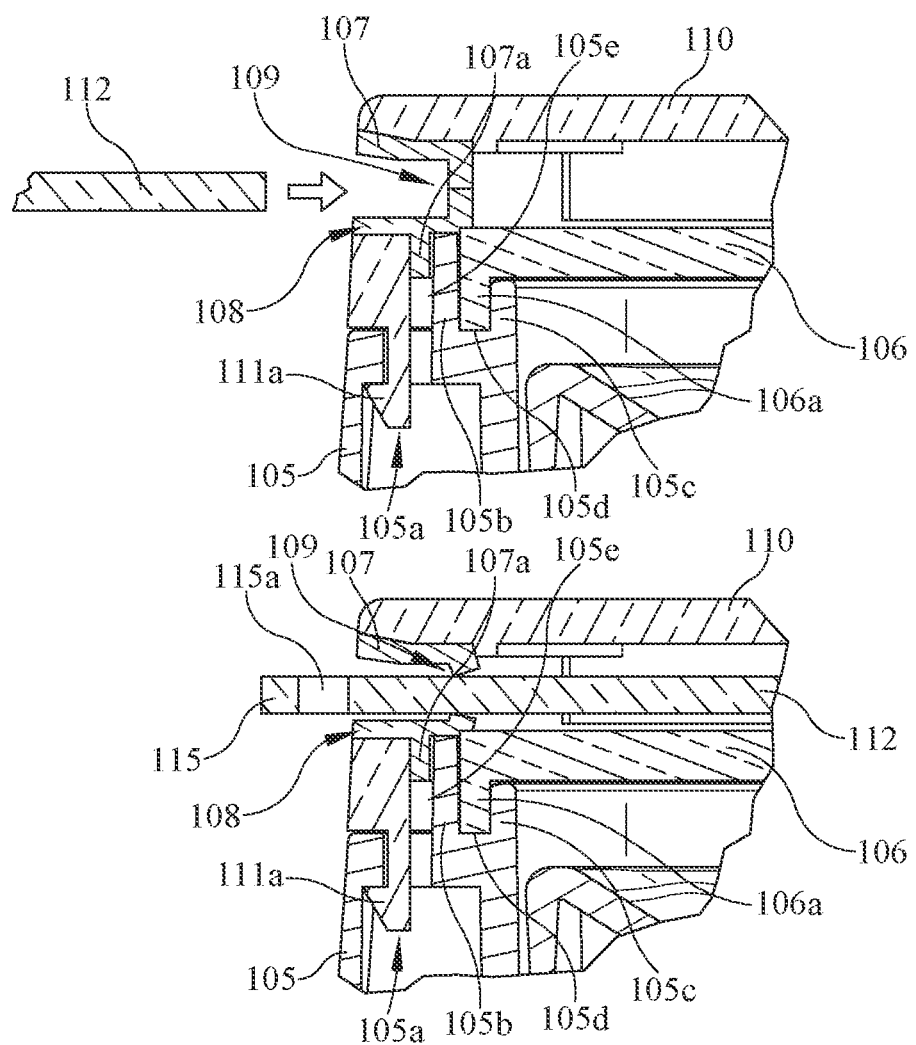
FIG. 3A is an enlarged cross-sectional view of a sealing mechanism for the color filter of the color changing security light of FIG. 1, according to an embodiment of the present disclosure.

In some embodiments, the locking mechanism may include a slot 105a and a protrusion 111a, and the slot 105a may be formed on one of the peripheral edge 105 of the lamp head 102 and a periphery 119 of the outer lens 110, and the protrusion 111a may be formed on the other one of the peripheral edge 105 of the lamp head 102 and the periphery 119 of the outer lens 110. In some embodiments, the slot 105a and the protrusion 111a may include a plurality of slots and a plurality of protrusions. In such embodiments, the protrusion 111a may be a plurality of elastic body locks, and the slot 105a may be a plurality of lock receiving openings as shown in FIGS. 3 and 3A. Many mechanical forms of a locking interface can be utilized between the outer frame and the lamp head, including systems and structures which allow both permanent assembly and also disassembly of the constituent parts. It should be understood that the locking mechanism is not limited here, some examples of locking mechanisms may include but are not limited to, a bracket, a hanger, a brace, a hook, a closed or open slit, a closed or open slot, or other structure enabling attachment of the outer lens 110 to the lamp head 102.

In some embodiments, the outer lens 110 may further include a continuous circumferential flange 111 substantially surrounding the periphery 119 of the outer lens 110 and the side 107 of the filter frame element 108 to retain the filter frame element 108 therein. In such embodiments, the flange 111 may include the lock mechanism (e.g., the elastic body lock and corresponding opening, etc.) in sealing engagement with the lamp head 102. In such embodiments, the flange 111 may also include a second opening 113 in alignment with the location of the opening 109 along the one side 107 of the filter frame element 108 for the slidably insertion of the color filter 112. In such embodiments, the color filter 112 may include an extension portion 115 that extends a distance through the opening 109 of the filter frame 108 and the second opening 113 of the outer lens 110 so that the color filter 112 can be removed/replaced from outside of the outer lens 110. In some embodiments, the extension portion 115 of the color filter 112 may further include a grasping mechanism for easily removing/replacing the color filter 112 by a user. For example, in some embodiments, the grasping mechanism may be a grasping opening 115a on the extension portion 115 of the color filter 112 as shown here. It should be understood that the locations and/or quantities of the openings 109 and 113 are not limited here. For example, there may be more than one openings 109 and corresponding second openings 113, so that the color filter 112 may be inserted into the filter frame 108 from various directions of the security light 100.

In some embodiments, the peripheral edge 105 of the lamp head 102 may be textured to facilitate the installation of the inner lens 106, the filter frame element 108, and/or the outer lens 110. For example, as shown in FIGS. 3 and 3A, the peripheral edge 105 may further include a first channel 105d formed by a first and second vertical lip elements 105b and 105c for receiving an inner lens projection 106a. Similarly, in some other embodiments, a second channel 105e formed by the flange 111 of the outer lens 110 and the first vertical lip element 105b may be configured for receiving a filter frame projection 107b. In some embodiments, the first vertical lip element 105*b* may have a larger height than that of the second vertical lip element 105*c*, so that the inner lens 106 may be in flush with the peripheral edge 105 of the lamp head 102 as shown in FIGS. 3 and 3A.

Figure 3B:
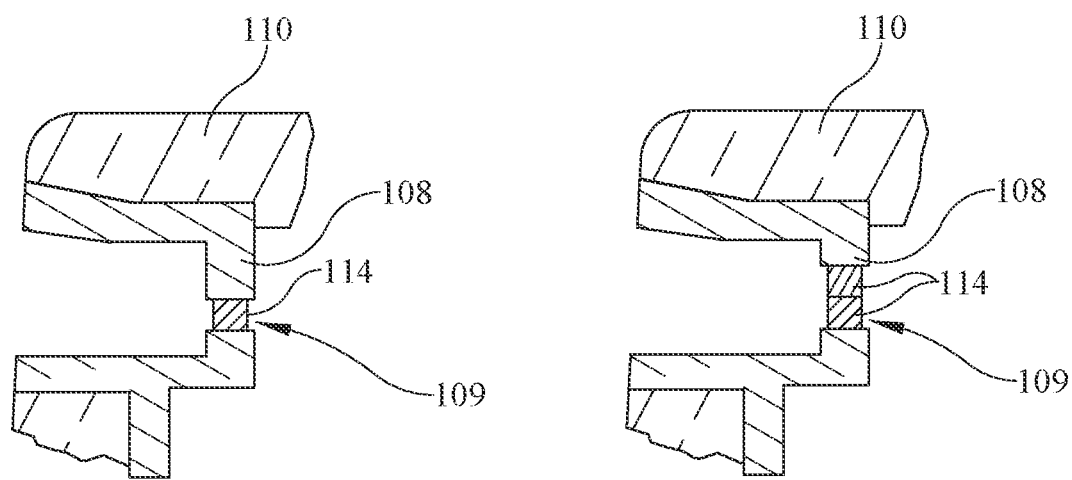
FIG. 3B is an enlarged cross-sectional view of another different sealing mechanism for the color filter of the color changing security light of FIG. 1, according to another embodiment of the present disclosure.

As mentioned previously, in some embodiments, a sealing mechanism may be provided at the opening 109 of the filter frame element 108 to prevent foreign matters from intruding into the interior of the filter frame 108. In some embodiments as best shown in FIG. 3A, the frame element 108 may be made of a pliable material, such as silicon or other types of synthetic rubber, and the thickness of the color filter 112 may be less than, equal to, or larger than that of the opening 109, so that the filter frame element 108 may function as a silicon gasket to seal off the color filter 112 automatically due to the resilient characteristics of the pliable material when the color filter 112 is inserted into the filter frame element 108. In some other embodiments as shown in FIG. 3B, the filter frame element 108 may also be made from non-pliable materials (e.g., plastic, metal, wood, etc.), with the sealing mechanism at the opening 109 including one or more pliable gasket elements 114 (e.g., rubber gaskets). In use, the color filter 112 may be inserted into the filter frame element 108 by merely pressing the color filter 112 against the sealing mechanism (e.g. rubber gaskets, etc.) at the opening 109, and suitable channels or guides (e.g., the sliding channel 107*a*) may be positioned along the inner surface or side 107 of the frame element 108 to ensure insertion of the color filter 112. In this regard, it will be understood that the color filter 112 normally rests within the filter frame element 108 with the color filter surface being parallel to the inner lens 106 and the outer lens 110 and spaced therefrom a distance sufficient to permit proper light focusing. In embodiments with the outer lens flange 111 for holding the filter frame element 108 along with the color filter 112 within the outer lens 110, similar sealing mechanisms (e.g., weather strips, rubber gaskets, etc.) may also be provided at the second opening 113 of the outer lens 110 in addition to the existing sealing mechanism at the opening 109 of the filter frame element 108. With the sealing mechanism, entry/insertion of the color filter 112 into the filter frame element 108 may result in a relatively tight water seal between the two members automatically, without the use of clamps or other external mechanisms. Thus, desired light color changing may be quickly and easily achieved merely by adding/exchanging the color filter 112 into the filter frame element 108. A stop of the color changing may also be quickly and easily achieved just by removing the color filter 112 from the filter frame element 108.

Figure 4:
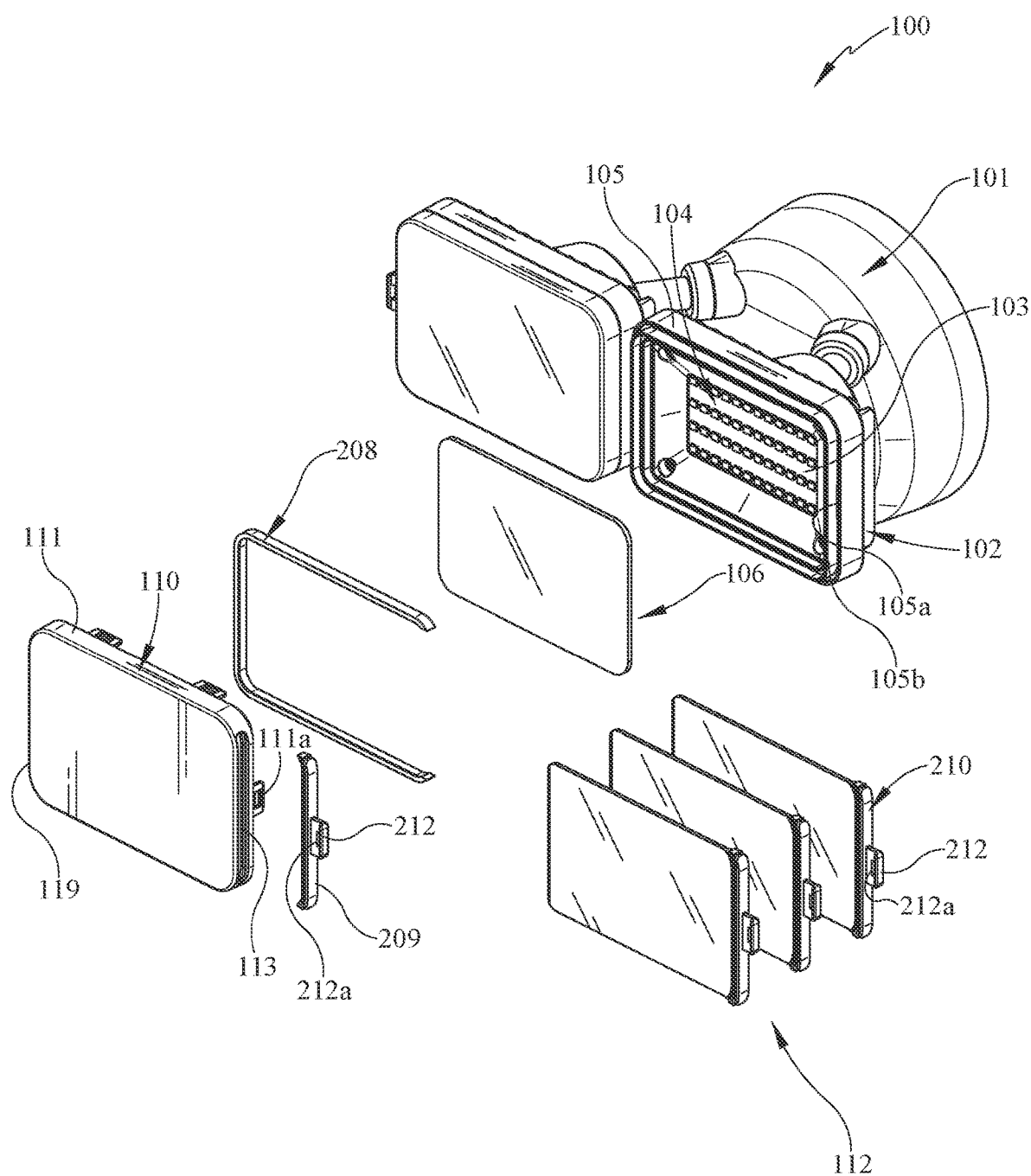
FIG. 4 is a perspective disassembled view of a color changing security light, according to an embodiment of the present disclosure.
Figure 5:
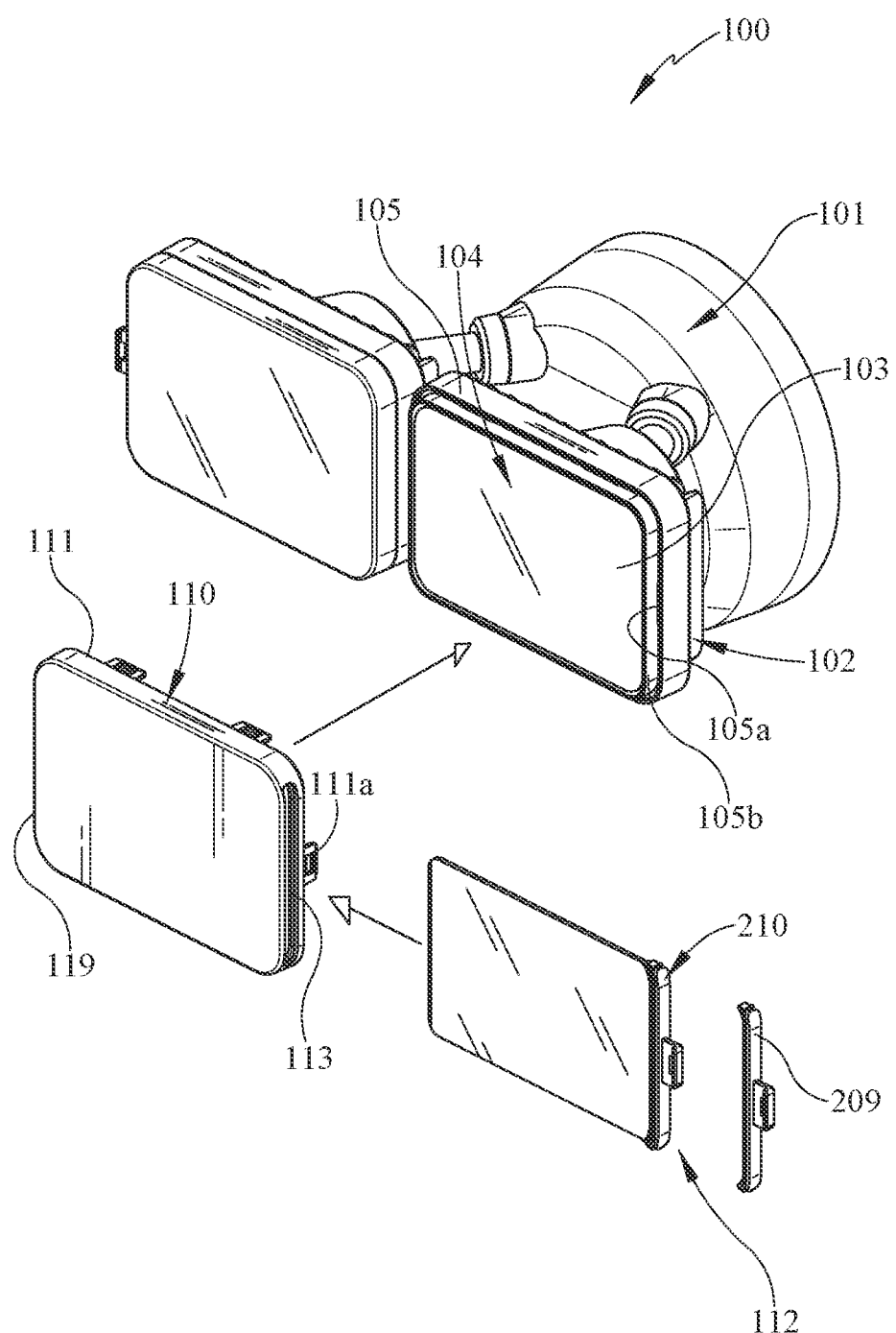
FIG. 5 is a perspective partially disassembled view of the color changing security light of FIG. 4, according to an embodiment of the present disclosure.

In some further embodiments, as shown in FIGS. 4, 5 and 6A-6C, one or more sealing gaskets instead of or in addition to the filter frame element 108 may be provided to prevent foreign matters especially moisture from intruding into the interior of the security light 100. For example, in some embodiments, a partial gasket ring 208 may be provided around at least a portion of the periphery 119 of the outer lens 110 to at least partially surround the inner lens 106 and/or the color filter 112 In combination with the gasket strip 210 positioned with the color filter, the two structures may providing an effective seal among the outer lens 110, the color filter 112, and the inner lens 106 to form a vapor-tight enclosure. The partial gasket ring 208 may in some embodiments be U-shaped (as shown in FIG. 4) and extend partially around the perimeter of the color filter 112. In other embodiments, the partial gasket ring 208 can be individual strips which extend around at least a partially around the periphery or which could extend continually around the periphery. In one such embodiment, as depicted in the Figures, the gasket strip 210 configured to seal the second opening 113 may be attached to a side of the color filter 112 approximate the second opening 113 and be configured to sealingly couple with the gasket ring 208 when the color filter 112 is inserted into the outer lens 110 through the second opening 113 on the flange 111 of the outer lens 110. In such a manner, the gasket ring 208 combined with the gasket strip 210 may substantially surround the color filter 112 when it is inserted into the outer lens 110 to provide a sealing engagement between the color filter 112 and the outer lens 110.

In other embodiments, partial or full gaskets may be provided on around the periphery of the color filter to combine with partial or limited seals positioned within the outer lens 110. For example, in some implementations, a seal may be provided along at least a partial extent of the peripheral edge of the color filter which mates with corresponding surfaces of the outer lens or other structure. In such implementations, the seal positioned on the color filter may be combined with a partial seal within or on or affixed to the outer lens 110 to functionally seal the interior electronic components from moisture intrusion. Hence, while one implementation is shown in the Figures wherein a seal strip is provided on the color filter, alternative combinations of partial seals on the color filter may be combined with variations of seals positioned within or near the outer lens to provide adequate moisture and dust seal engagement.

Figure 6A:
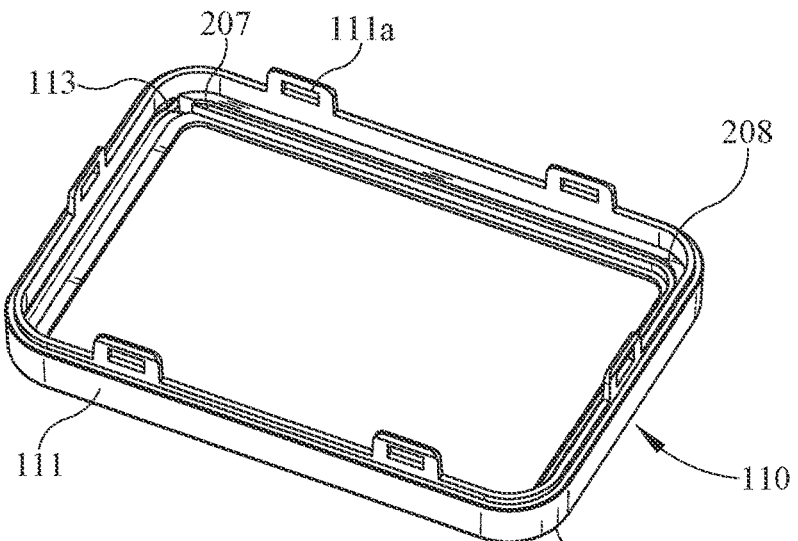
FIGS. 6A-6C are enlarged perspective views of the sealing gaskets for the color changing security light of FIG. 4, according to various embodiments of the present disclosure.
Figure 6B:
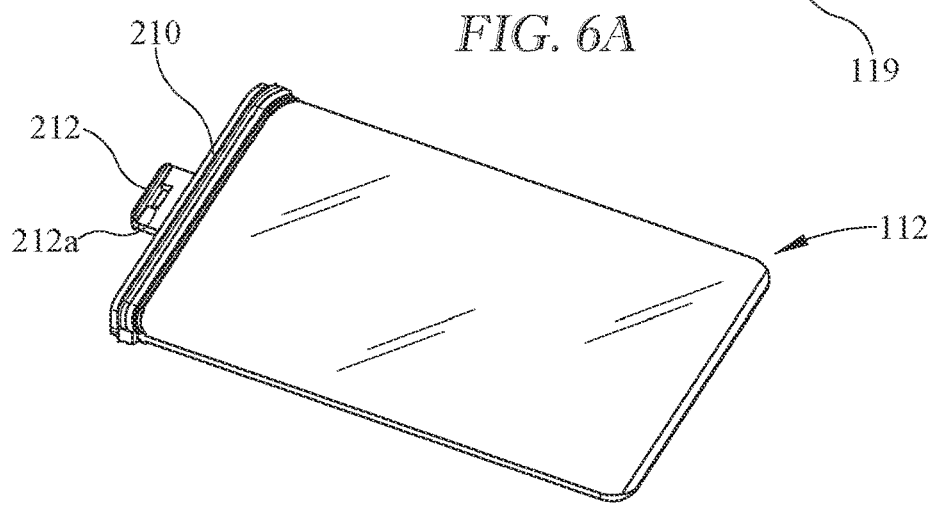

In some embodiments, as shown in FIG. 6A, the gasket ring 208 may be fixed within the outer lens 110 by positioning within a gasket ring receiving notch or channel 207 around the periphery 119 of the outer lens 110. In some other embodiments, the gasket ring 208 and/or the gasket strip 210 may be adhesively attached to the outer lens 110 and the color filter 112 respectively, thereby preventing any moisture from entering into lamp and/or electronic compartment. It should be understood that the gasket ring 208 and the gasket strip 210 may be adhered to the outer lens 110 and the color filter 112 but may alternatively be positioned separately.

Figure 6C:
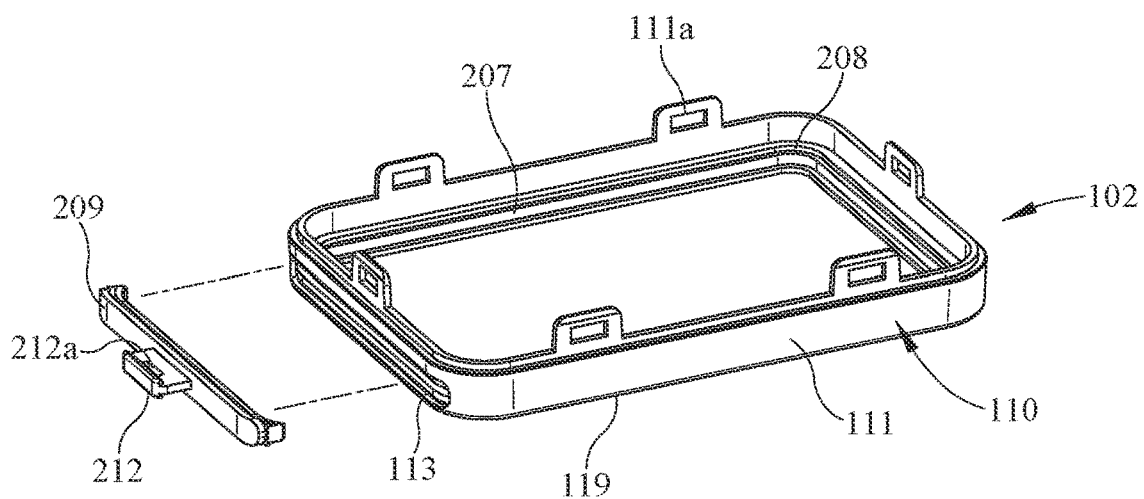

In some embodiments, when the color tuning is not desired, an opening filling gasket 209 as shown in FIG. 6C may be provided to seal the second opening 113 on the flange 111 of the outer lens 110. In such embodiments, the opening filling gasket 209 may also have a grasping portion 212 with a grasping opening 212*a* for easily inserting and/or removing the color filter 112 into and/or from the outer lens 110. Filling gasket 209 may include a seal portion which engages the opening 113 of the outer lens 110. In some embodiments, the opening filling gasket 209 may be a rubber weather strip matching the dimension of the second opening 113. The gasket ring 208, opening filling gasket 209, and gasket strip 210 may be made of a silicone composition (e.g., silicone rubber) that is heat-resistant to withstand the varying temperatures produced by the light. In other embodiments, a gasket may be provided around the periphery of a plastic or metal cover. It should be understood that the gasket may be made of any suitable resilient/elasticity material suitable for sealing. For example, in some embodiments, the gasket may be of a closed cell sponge seal such as a die cut gasket.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A security light, comprising:
   at least one lamp head having a peripheral edge, the peripheral edge of the at least one lamp head surrounding a light source;
   an inner lens mountable over and retained on the peripheral edge of the at least one lamp head;
   a filter frame element positioned between the inner lens and an outer lens and having a filter frame element opening along one side;
   wherein the outer lens retains the filter frame element in position against the inner lens and mounts to the at least one lamp head positioning the filter frame element between the outer lens and the inner lens;
   the outer lens having an outer lens opening in substantial alignment with the filter frame element opening;
   a mechanical color filter slidable through the filter frame element opening and surrounded by the filter frame element;
   a locking mechanism between the outer lens and the at least one lamp head to structurally retain the outer lens, the filter frame element, and the inner lens on the at least one lamp head; and
   a sealing mechanism at the filter frame element opening.

2. The security light of claim 1 wherein the inner lens has an inner lens projection.

3. The security light of claim 2, wherein the peripheral edge of the at least one lamp head includes a first channel formed by a first vertical lip element and a second vertical lip element for receiving the inner lens projection.

4. The security light of claim 3, wherein a height of the first vertical lip element is larger than that of the second vertical lip element.

5. The security light of claim 1, wherein a thickness of the mechanical color filter is larger than that of the filter frame element opening along the one side of the filter frame element.

6. The security light of claim 1, wherein the sealing mechanism includes one or more pliable gasket elements at the filter frame element opening along the one side of the filter frame element.

7. The security light of claim 1, wherein the locking mechanism includes a slot and a protrusion, the slot is formed on one of the peripheral edge of the at least one lamp head and a periphery of the outer lens, and the protrusion is formed on the other one of the peripheral edge of the at least one lamp head and the periphery of the outer lens.

8. The security light of claim 7, wherein the slot and the protrusion include a plurality of slots and a plurality of protrusions.

9. The security light of claim 8, wherein the plurality of protrusions include a plurality of elastic body locks and the plurality of slots include a plurality of lock receiving openings.

10. The security light of claim 1, wherein the outer lens further comprises a continuous circumferential flange and/or internal channel substantially surrounding the filter frame element to retain the filter frame element within the outer lens.

11. The security light of claim 10, wherein the continuous circumferential flange of the outer lens and a first vertical lip element of the peripheral edge of the at least one lamp head form a second channel for receiving a filter frame projection.

12. The security light of claim 11, wherein the continuous circumferential flange further comprises a second opening in alignment with a location of the filter frame element opening along the one side of the filter frame element.

13. The security light of claim 12, wherein the mechanical color filter further comprises an extension portion that extends a distance from the second opening on the continuous circumferential flange of the outer lens.

14. The security light of claim 1, wherein the light source includes a plurality of LEDs.

15. The security light of claim 1, wherein the mechanical color filter serves as a light diffuser.

16. A security light, comprising:
at least one lamp head having a peripheral edge, the peripheral edge of the at least one lamp head surrounding a light source;
an inner lens mountable over and retained on the peripheral edge of the at least one lamp head;
an outer lens having an opening along one side;
a mechanical color filter slidable through the opening along the one side of the outer lens and positioned between the inner lens and the outer lens and surrounded by a gasket ring; and
a locking mechanism between the outer lens and the at least one lamp head to structurally retain the outer lens, the mechanical color filter, and the inner lens on the at least one lamp head, wherein
the outer lens retains the gasket ring in position against the inner lens and mounts to the at least one lamp head positioning the gasket ring between the outer lens and the inner lens.

17. The security light of claim 16, further comprising an opening filling gasket coupled with the opening along the one side of the outer lens.

18. The security light of claim 16, the mechanical color filter further comprising a gasket strip at a side approximate the opening along the one side of the outer lens.

19. A security light, comprising:
at least one lamp head having a peripheral edge, the peripheral edge of the at least one lamp head surrounding a light source;
an inner lens mountable over and retained on the peripheral edge of the at least one lamp head;
a pliable filter frame element positioned between the inner lens and an outer lens and having a filter frame element opening along one side;
wherein the outer lens retains the pliable filter frame element in position against the inner lens and mounts to the at least one lamp head positioning the pliable filter frame element between the outer lens and the inner lens, the outer lens has a continuous circumferential flange substantially surrounding the pliable filter frame element to retain the pliable filter frame element within the outer lens and a second opening in alignment with a location of the filter frame element opening along the one side of the pliable filter frame element;
a mechanical color filter slidable through the filter frame element opening along the one side of the pliable filter frame element and the aligned second opening on the continuous circumferential flange of the outer lens, and positioned between the inner lens and the outer lens and surrounded by the pliable filter frame element, the mechanical color filter having an extension portion that extends a distance from the second opening on the continuous circumferential flange of the outer lens; and
a locking mechanism between the outer lens and the at least one lamp head to structurally retain the outer lens, the pliable filter frame element, and the inner lens on the at least one lamp head.

20. The security light of claim 19, wherein the peripheral edge of the at least one lamp head includes a first channel formed by a first vertical lip element and a second vertical lip element for receiving an inner lens projection, and a second channel formed by the continuous circumferential flange of the outer lens and the first vertical lip element of the peripheral edge of the at least one lamp head for receiving a filter frame projection.

* * * * *